(12) United States Patent
Chefetz et al.

(10) Patent No.: US 8,464,666 B2
(45) Date of Patent: Jun. 18, 2013

(54) DOG TOY BALL DUAL TREAT HOLDER

(76) Inventors: Nathan S. Chefetz, McLean, VA (US);
Cade Goldberg, Washington, DC (US)

( * ) Notice: Subject to any disclaimer, the term of this patent is extended or adjusted under 35 U.S.C. 154(b) by 160 days.

(21) Appl. No.: 12/800,543

(22) Filed: May 17, 2010

(65) Prior Publication Data

US 2011/0185980 A1  Aug. 4, 2011

Related U.S. Application Data

(60) Provisional application No. 61/282,386, filed on Feb. 1, 2010.

(51) Int. Cl.
*A91K 29/00* (2006.01)
(52) U.S. Cl.
USPC ............................................ 119/709
(58) Field of Classification Search
USPC ................... 119/707, 709, 710, 711
See application file for complete search history.

(56) References Cited

U.S. PATENT DOCUMENTS

| 6,073,581 | A  | * | 6/2000 | Wang ..................... | 119/51.01 |
| 7,389,748 | B2 | * | 6/2008 | Shatoff et al. ................ | 119/707 |
| 2006/0254531 | A1 | * | 11/2006 | Willinger ...................... | 119/710 |
| 2007/0022971 | A1 | * | 2/2007 | Renforth et al. ............... | 119/707 |
| 2007/0289553 | A1 | * | 12/2007 | Jager ............................. | 119/710 |

* cited by examiner

*Primary Examiner* — Rob Swiatek
*Assistant Examiner* — Lisa Tsang
(74) *Attorney, Agent, or Firm* — Michael J. Foycik, Jr.

(57) ABSTRACT

A pet chew toy, especially for dogs, has a resilient body in the shape of a ball which has a body and a pair of openings which lead into respective interior chambers inside the body of the ball. A generally S-shaped curved wall separates the two interior chambers. Each interior chamber is bounded by a semi-spherical side wall and the generally S-shaped curved wall. The semi-spherical side wall of each chamber has a ledge portion such that the opening disposed near the opening, for aiding in retention of a pet treat which is placed inside the chamber. The ledge is not radially disposed with reference to a center of the ball.

The two interior chambers are symmetrical. The hollow interior body of the ball can thus hold either one pet treat in either chamber, or two pet treats with one treat being in each chamber. An air hole can also be provided in a wall distal from the opening of each chamber, to prevent suction from developing when the pet places its tongue into the interior chamber.

3 Claims, 7 Drawing Sheets

DOG TOY BALL DUAL TREAT HOLDER

This application claims the priority of Provisional Patent Application No. 61/282,386, entitled "Dog Toy Ball Dual Treat Holder" filed on Feb. 1, 2010 to inventors Nathas S. Chefetz and Cade Goldenberg.

FIELD OF THE INVENTION

The present invention relates to pet chew toys which can hold treats or food, which are useful for training and amusing pets, and which can promote healthy pet teeth and gums.

BACKGROUND OF THE INVENTION

Pet chew toys are well known. Many wear out easily, are chewed up easily, or are not very entertaining to the pet such that the pet loses interest.

There is a great demand for pet chew toys, especially for dog chew toys, which do not wear out easily, do not get chewed up easily, and which continue to maintain the interest of the pet throughout the life of the chew toy.

With ordinary chew toys having a compartment for food, the food is removed too easily. Dogs then consume too much food, too quickly. This can lead to obesity of the dog, which is unhealthy.

Accordingly, it is a problem in the art to provide pet chew toys, especially for dogs, which do not wear out easily, do not get chewed up easily, and which continue to maintain the interest of the pet throughout the life of the chew toy.

Further, there is a need for a longer lasting dog chew toy shape that has more than one cavity where food is held for longer periods of time, and a toy that promotes human interaction which increases the bond between the dog and a person.

It is a problem in the prior art to provide a device for keeping food or treats inside the ball when thrown, and keeping a dog's attention on the dog chew toy ball.

SUMMARY OF THE INVENTION

From the foregoing, it is seen that it is a problem in the art to provide a device meeting the above requirements. According to the present invention, a device and process are provided which meets the aforementioned requirements and needs in the prior art.

Specifically, the device according to the present invention is a pet chew toy, especially for dogs, which does not wear out easily, does not get chewed up easily, has more than one cavity for food, and which continues to maintain the interest of the pet throughout the life of the chew toy.

More particularly, the invention relates to a pet chew toy having a resilient body in the shape of a ball which has a body and a pair of openings which lead into respective interior chambers inside the body of the ball. A generally S-shaped curved wall separates the two interior chambers. Each interior chamber is bounded by a semi-spherical side wall and the generally S-shaped curved wall. The semi-spherical side wall of each chamber has a ledge portion such that the opening disposed near the opening, for aiding in retention of a pet treat which is placed inside the chamber. The ledge is not radially disposed with reference to a center of the ball.

The two interior chambers are symmetrical; however, symmetry is not necessary, and it is contemplated as being within the scope of the present invention for the two chambers to be of different sizes or shapes. The hollow interior body of the ball can thus hold either one pet treat in either chamber, or two pet treats with one treat being in each chamber. An air hole can also be provided in a wall distal from the opening of each chamber, to prevent suction from developing when the pet places its tongue into the interior chamber. However, the air hole is not necessary to the invention, and can be omitted. It is contemplated as being within the scope of the present invention for the air holes to be omitted, or multiple air holes provided for each chamber.

Other objects and advantages of the present invention will be more readily apparent from the following detailed description when read in conjunction with the accompanying drawings.

DETAILED DESCRIPTION OF THE INVENTION

Figure 1:
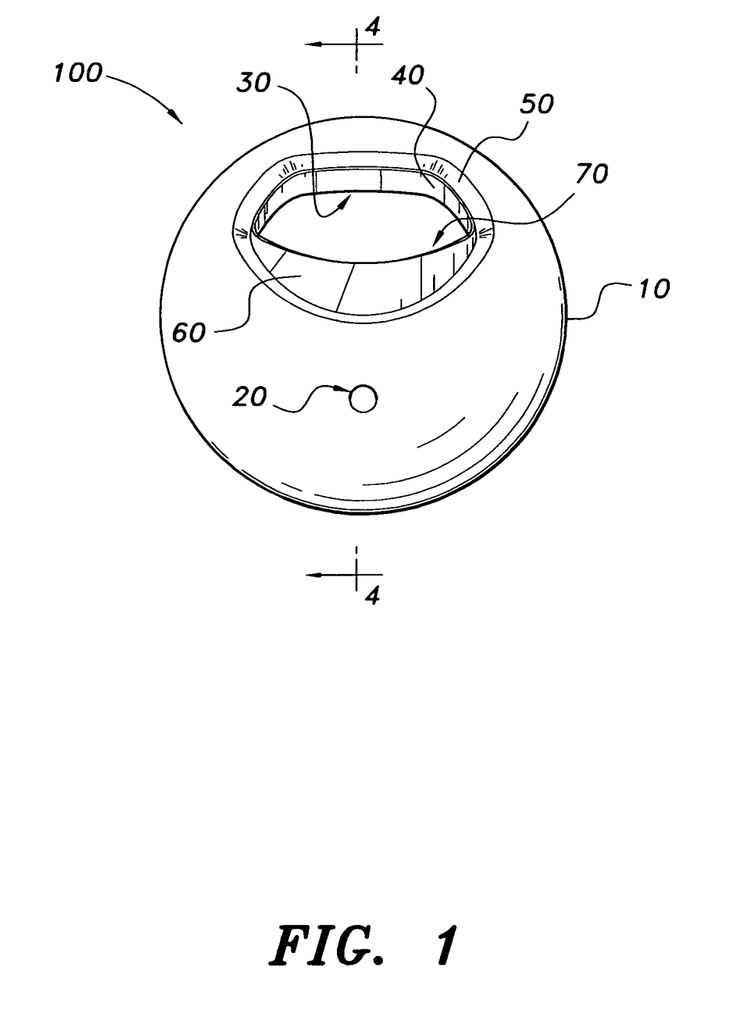
FIG. 1 is a perspective view of the dog toy ball dual treat holder according to the invention.

FIG. 1 is a perspective view of a dog toy ball dual treat holder 100 having a body 10 and a first opening 30 leading into a first interior region 70. The dog toy ball 100 is preferably formed by molding, and is preferably formed of a resilient material such as rubber or resiliently deformable plastic material. The pet toy 100 has the shape of a ball, and the first interior region or chamber 70 is used to hold a pet treat or food in order to enhance the play value of the dog toy ball dual treat holder 100 and to increase a pet's attention to the dog toy ball dual treat holder 100.

More particularly, the dog toy ball dual treat holder 100 is a pet chew toy which can contain one or two separate treats, and wherein the body 10 is a resilient body 10 in the shape of a ball having first and second openings 30 and 130 (shown in FIGS. 1 and 3) which lead into respective interior chambers 70 and 170 inside the body 10. A generally S-shaped curved wall 300 (shown in FIG. 4) separates the two interior chambers 70 and 170.

As shown in FIG. 1, the dog toy ball dual treat holder 100 has an air hole 20 which is an aperture communicating between the outer surface of the body 10 and the first interior chamber 70. The first opening 30 is bounded by a rim portion 50, a concave wall portion 40, and a convex wall portion 60.

Figure 2:
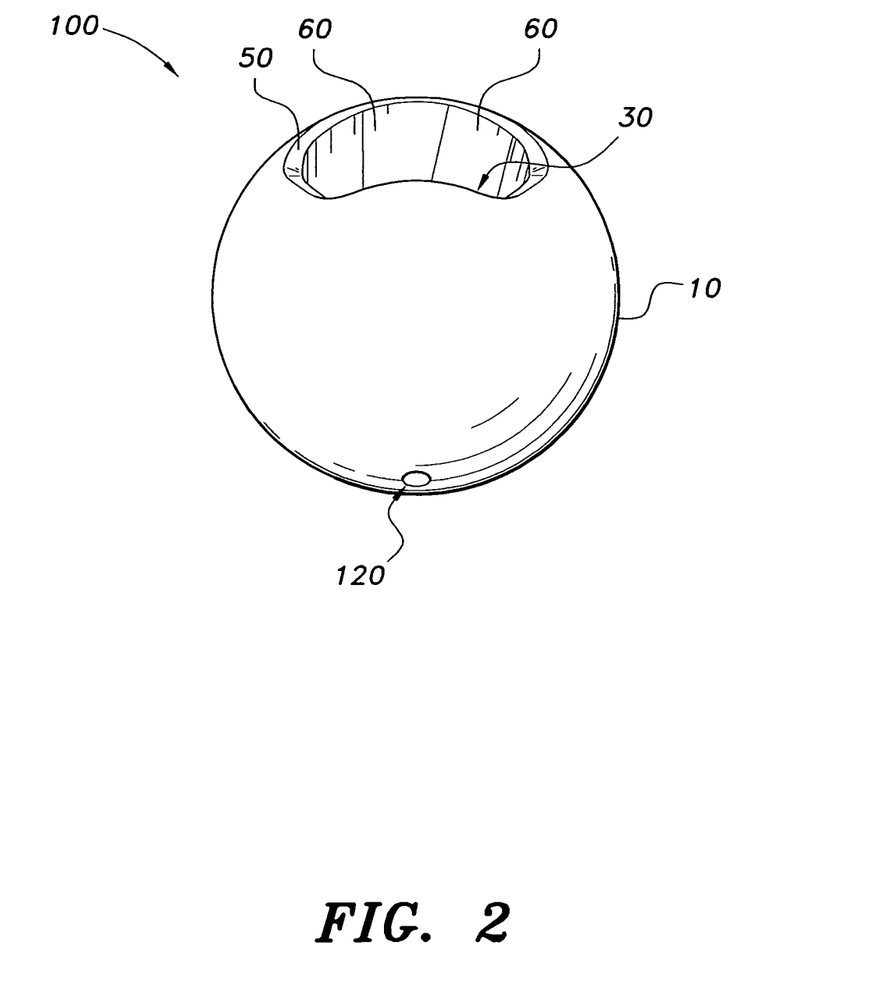
FIG. 2 is a top elevational view of the dog toy ball dual treat holder of FIG. 1, and rotated 180 degrees.

FIG. 2 is a top elevational view of the dog toy ball dual treat holder 100 of FIG. 1, and rotated 180 degrees. Here, the convex wall portion 60 is shown visible, and a second air hole 120 is shown. The air hole 120 is an aperture communicating between the outer surface of the body 10 and the second interior chamber 170.

Figure 3:
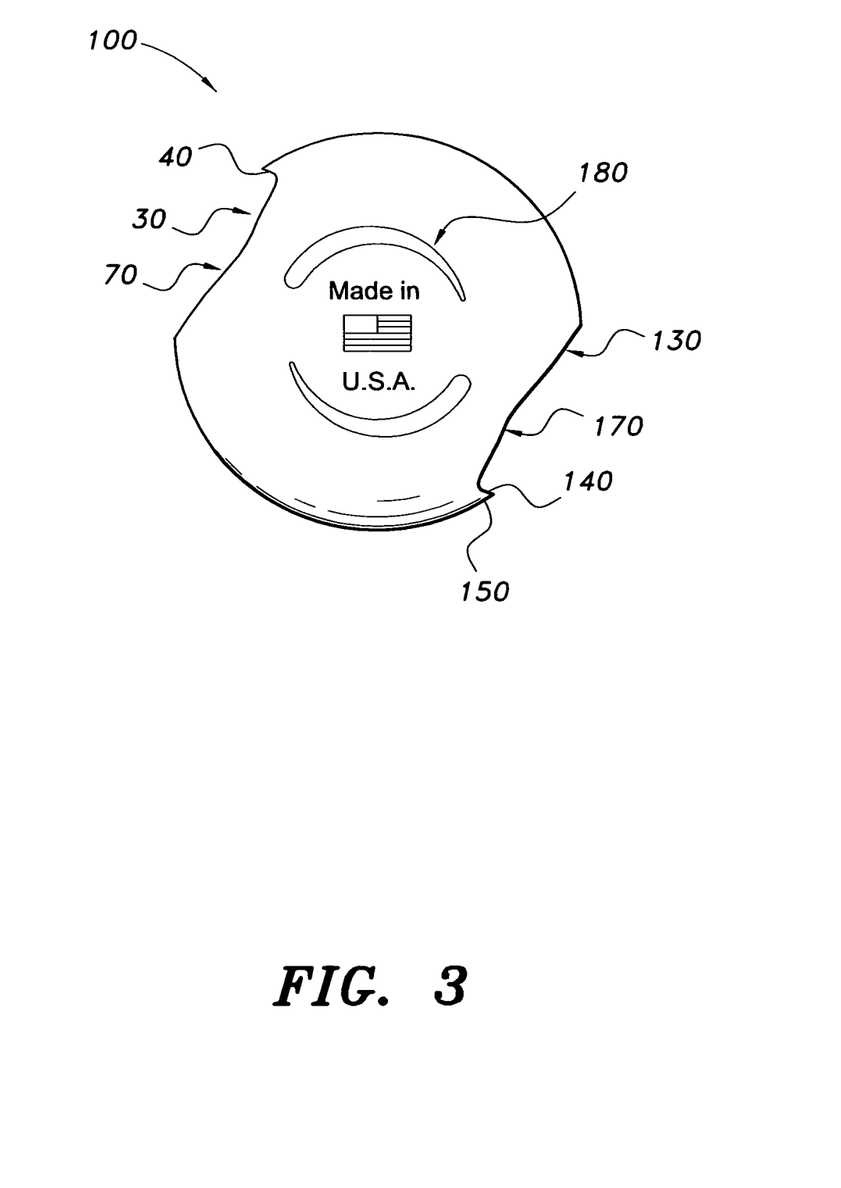
FIG. 3 is a side elevational view taken from the right side of FIG. 1.

FIG. 3 is a side elevational view taken from the right side of the dog toy ball dual treat holder 100 of FIG. 1, showing the first opening 30 and the second opening 130. As stated hereinabove, the first opening 30 is bounded by the rim portion 50, the concave wall portion 40, and the convex wall portion 60. The second opening 130 is bounded by a rim portion 150, a concave wall portion 140, and a convex wall portion 160 (shown in FIG. 4). The first opening 30 leads into the first interior chamber 70. The second opening 130 leads into the second interior chamber 170. Indicia 180 is shown in FIG. 3 disposed on the body 10; various kinds of indicia can be displayed on the surface of the body 10, or such indicia may be omitted entirely.

Figure 4:
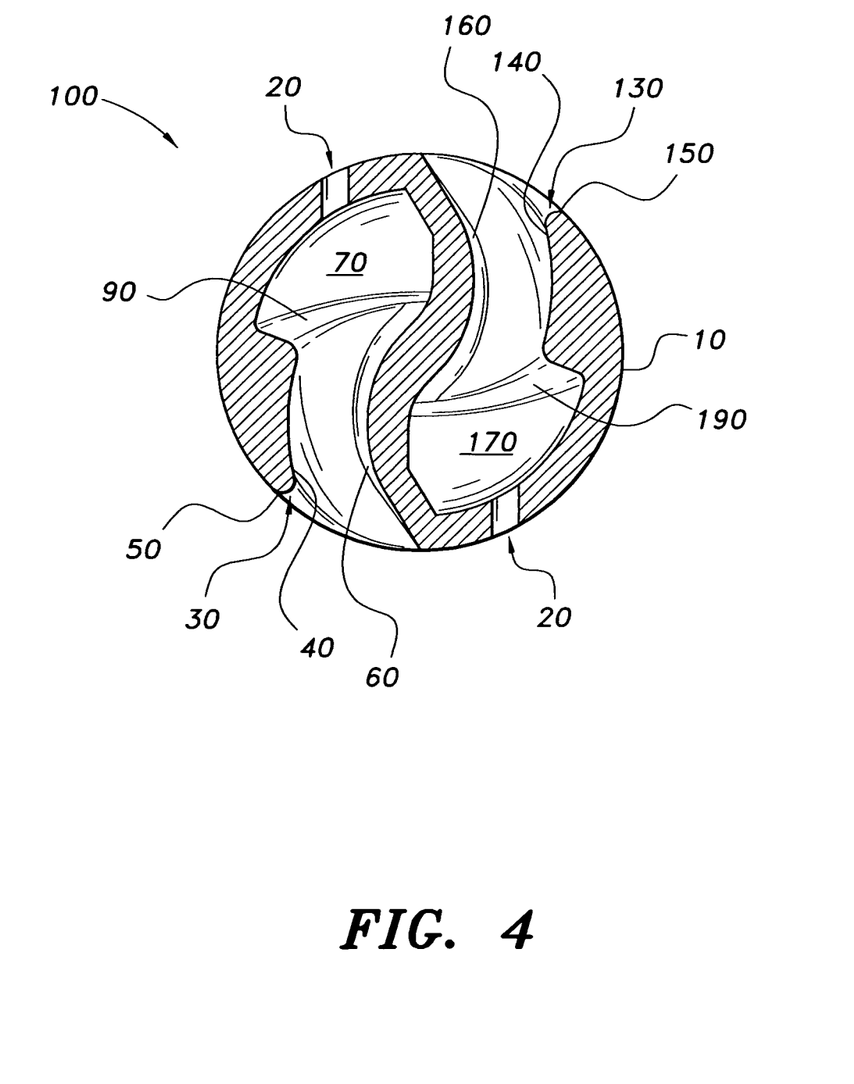
FIG. 4 is a sectional view taken along line 4-4 of FIG. 1, and rotated 90 degrees.

FIG. 4 is a sectional view taken along line 4-4 of FIG. 1, and rotated 90 degrees. FIG. 4 shows the interior chambers 70 and 170, separated by the generally S-shaped curved wall 300. The generally S-shaped curved wall 300 has the surface 60 on one side thereof, and the surface 160 on the other side thereof. This figure shows the first opening 30 communicating with the first interior chamber 70 and the second opening 130 communicating with the second interior chamber 170. The air holes 20 and 120 are also shown in this view, wherein the first air hole 20 communicates with the first interior chamber 70 and the second air hole 120 communicates with the second interior chamber 170. A ledge portion 90 is formed which is curved. The ledge portion 90 is not radially aligned with respect to a center point of the ball-shaped body 10, but is offset with respect to a radius of the ball-shaped body 10. As seen in FIG. 4, the first interior chamber 70 is generally mushroom-shaped, and the second interior chamber 170 is also generally mushroom-shaped.

The shape and location of the ledge portion 90 aids in retention of a pet treat 800 (shown in FIG. 8) disposed in the first interior chamber 70. As the pet treat 800 is inserted into the opening 30, the resilient material of the body 10 deforms somewhat to permit entry into the first interior chamber 70. Once the pet treat 800 is inserted past the ledge portion 90 and the pet treat 800 is released, and the body 10 is also released, the resilient material of the body 10 returns to its original shape and the pet treat 800 is retained by the ledge portion 90 inside the first interior chamber 70.

Figure 8:
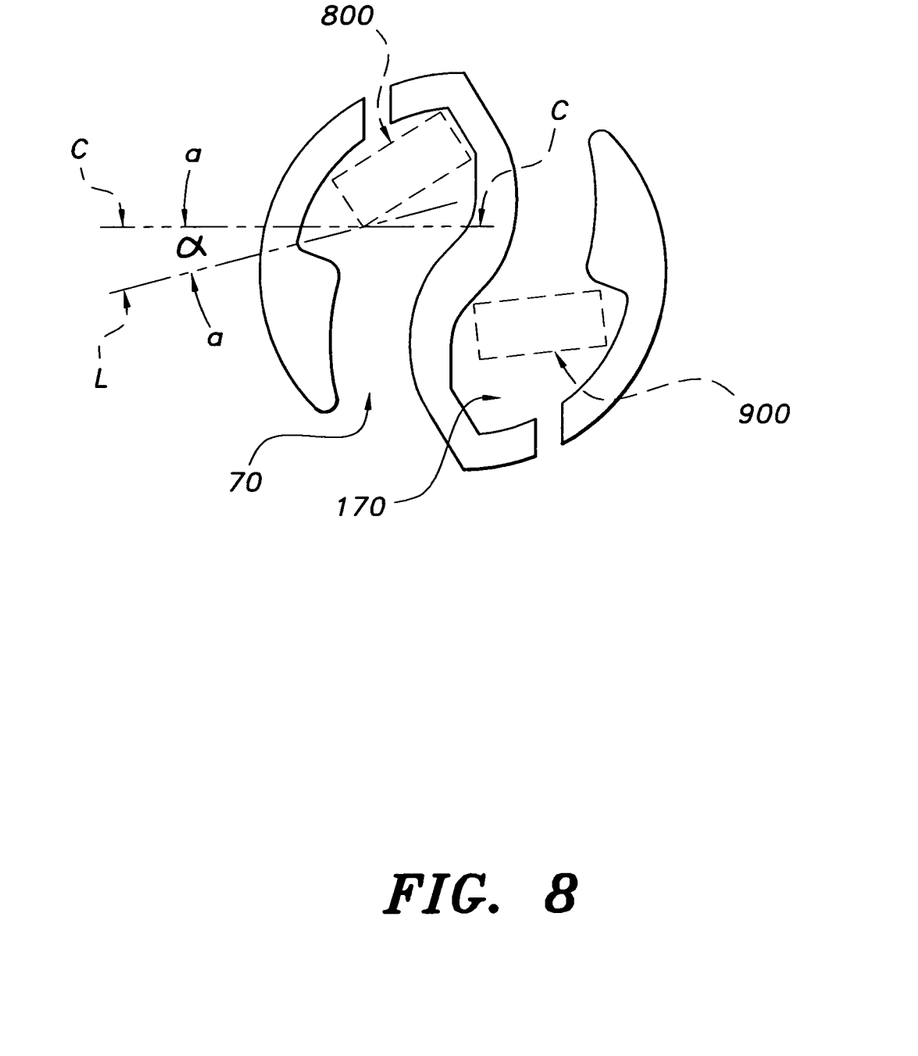
FIG. 8 is a schematic view of the interior portion of the dog toy ball dual treat holder of FIGS. 1-5 showing it in use holding two pet treats shown in phantom outline.

The ledge portion 190 in the second interior chamber 170 has the same function and purpose as ledge 90, and holds a pet treat 900 (shown in FIG. 8). As the pet treat 900 is inserted into the opening 130, the resilient material of the body 10 deforms somewhat to permit entry into the second interior chamber 170. Once the pet treat 900 is inserted past the ledge portion 190 and the pet treat 900 is released, and the body 10 is also released, the resilient material of the body 10 returns to its original shape and the pet treat 900 is retained by the ledge portion 190 inside the second interior chamber 170.

As seen in FIG. 4, each of the interior chambers 70 and 170 are bounded by semi-spherical side walls, namely concave wall portion 40 and concave wall portion 140. These side walls are along interior surfaces of the body 10. The interior chambers 70 and 170 have a common wall, namely the S-shaped curved wall 300 which has opposed surfaces 60 and 160. As noted hereinabove, the semi-spherical side walls 40, 140 of each of the chambers 70 and 170 also include respective ledge portions 90, 190 as shown in FIG. The ledge portions 90, 190 are not radially disposed with reference to a center of the body 10, but instead are angled with respect to the center. This is illustrated further in FIG. 8, and discussed hereunder.

While, the two interior chambers 70 and 170 are shown as being substantially symmetrical to each other, such symmetry is not necessary to the invention, and it is contemplated as being within the scope of the present invention for the two chambers to be of different sizes or of different shapes. The hollow interior portions of the body 10 of the dog toy ball dual treat holder 100 can thus hold either one pet treat in either of the chambers 70, 170, or it can hold two pet treats with one treat being in chamber 70 and the another pet treat being in chamber 170. As shown in FIG. 4, the air holes 20 and 120 are disposed in a wall portion which is distal from the entrance into the respective chambers 70 and 170, and these air holes serve to prevent suction from developing when a pet places its tongue into either of the interior chambers 70 and 170. However, the air holes are not necessary to the invention, and can be omitted. It is contemplated as being within the scope of the present invention for the air holes to be omitted, and also to provide multiple air holes for each chamber.

Figure 5:
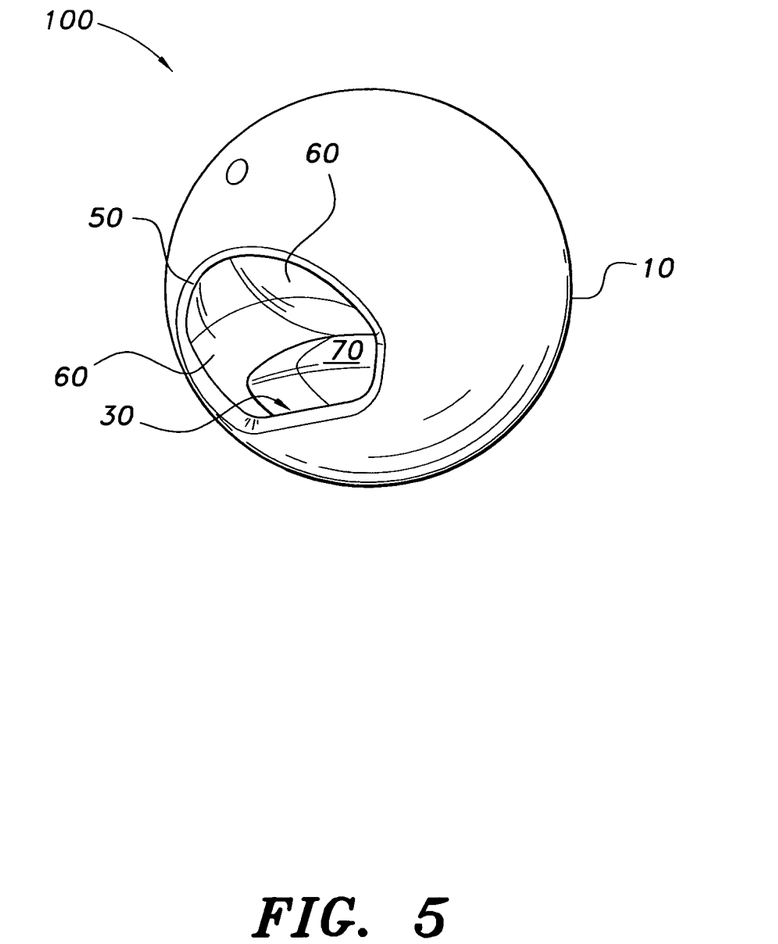
FIG. 5 is another elevational view of the dog toy ball dual treat holder of FIG. 1, and showing a rear portion of the dog toy ball including an opening and an air hole.

FIG. 5 is an elevational view of the dog toy ball dual treat holder 100 of FIG. 1 showing a rear portion of the dog toy ball dual treat holder 100, including the opening 30 and the air hole 20. Here, the dog toy ball dual treat holder 100 is shown rotated about 45 degrees about the vertical axis as compared with FIG. 1, and about 180 degrees about an axis orthogonal to the plan of the drawing, to demonstrate the shape of the opening 30 more clearly.

Figure 6:
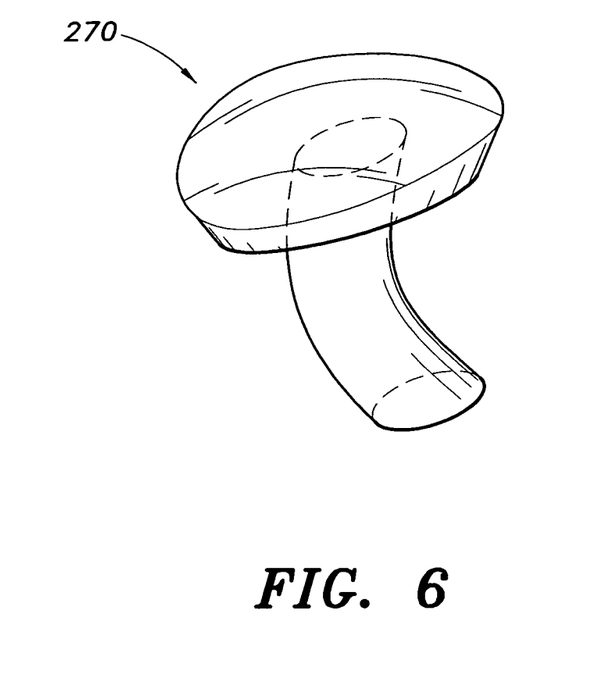
FIG. 6 is schematic elevational view of an outline of an outline of the interior space inside the dog toy ball dual treat holder of FIG. 1.

FIG. 6 is schematic elevational view of an illustrative outline of an interior space 270. This space 270 can be considered to be similar to the interior spaces 70 and 170 inside the dog toy ball dual treat holder 100 of FIG. 1. Here, the illustration is not to scale nor is it an exact shape corresponding to FIGS. 1-4, and as such can be considered to be an alternative embodiment. This drawing illustrates conceptually what type of shape can be used for the interior chambers 70 and 170. The "head" of the mushroom-shaped space 270 is what retains the treat, the narrower "stem" of the space 270 allowing insertion of the treat into the above-mentioned "head" of the space 270.

Figure 7:
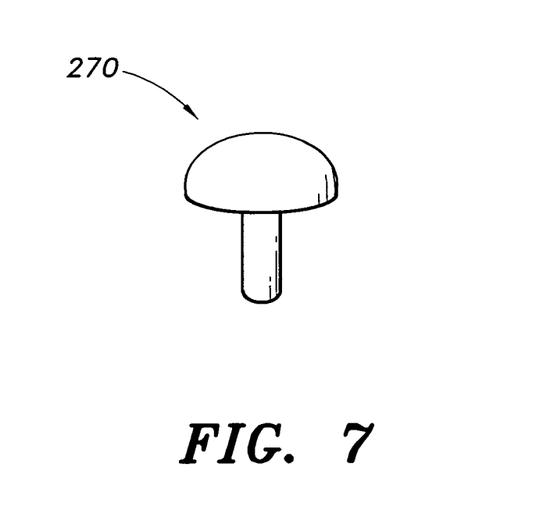
FIG. 7 is schematic front elevational view of the interior space shown in FIG. 6.

FIG. 7 is schematic front elevational view of the outline of the interior space 270 shown in FIG. 6.

FIG. 8 is a schematic view of the interior portion of the dog toy ball dual treat holder 100 of FIGS. 1-5, showing it in use holding two pet treats 800 and 900 which are shown in phantom outline. The pet treat 800 is held in the first interior chamber 70, and the pet treat 900 is held in the second interior chamber 170.

FIG. 8 also shows the center C of the body 10, and a radial line R extending from the center C and through the ledge of chamber 70. A line L is shown which is generally aligned with the ledge 90 (shown in FIG. 4 and omitted from FIG. 8 for the sake of clarity). As seen in FIG. 8, the line L and the line R meet at an angle "a" which is non-zero. Thus, the ledge 90 does not extend radially.

While pet treats are shown, any food item attractive to pets can be placed in the chambers 70 and 170. Also, while the dog toy ball dual treat holder 100 is shown and described as being for dogs, it is also suitable for other types of pet that chew or gnaw. The body 10 is made in a variety of sizes, so that a smaller version can be used for smaller dogs, and a larger version used for larger dogs.

The invention being thus described, it will be evident that the same may be varied in many ways. Such variations are not to be regarded as a departure from the spirit and scope of the invention and all such modifications are intended to be included within the scope of the claims.

What is claimed is:

1. A pet chew toy, especially for dogs, for retaining first and second hard pet treats which can be manually inserted and removed yet cannot be readily removed by a dog, comprising:
a resilient body in the shape of a sphere; said resilient body having a first opening leading into a first interior chamber; said first opening being bounded by a generally U-shaped rim portion and by a relatively wide and relatively flattened convex wall portion adapted to allow sliding entry of the first hard pet treat into said first interior chamber; said generally U-shaped rim portion of said first opening having a rounded lip;

the first interior chamber having a narrow portion, a curved ledge, and an enlarged portion, whereby the first hard pet treat can be inserted through the narrow portion and into the enlarged portion where it is retained inside the first interior chamber by the curved ledge;

said first opening of said resilient body leading into said narrow portion of said first interior chamber, which in turn communicates with said enlarged portion of said first interior chamber, said narrow portion of said first interior chamber being adapted to facilitate sliding entry of the first hard pet treat therealong;

said curved ledge and said narrow portion of said first interior chamber having an undeformed condition and a deformed condition; said undeformed condition persisting before insertion of the first hard pet treat and after insertion of the first hard pet treat into said enlarged portion of said first interior chamber; said deformed condition of said curved ledge and said narrow portion of said first interior chamber occurring during sliding insertion of the first hard pet treat along said narrow portion of said first interior chamber and past said curved ledge of said first interior chamber and on into said first interior chamber, so that the first hard pet treat can be inserted manually into said enlarged portion of said first interior chamber and be retained within said enlarged portion of said first interior chamber by said curved ledge of said first interior chamber;

said resilient body having a second opening leading into a second interior chamber; said second interior chamber being substantially symmetrical with said first interior chamber;

said second opening being bounded by a generally U-shaped rim portion and by a relatively wide and relatively flattened convex wall portion adapted to allow sliding entry of the second hard pet treat into said second interior chamber; said generally U-shaped rim portion of said second opening having a rounded lip;

the second interior chamber having a narrow portion, a curved ledge, and an enlarged portion, whereby the second hard pet treat can be inserted through the narrow portion of the second interior chamber and into the enlarged portion of the second interior chamber where the second hard pet treat is retained inside the second interior chamber by the curved ledge of the second interior chamber;

said second opening leading into said narrow portion of said second interior chamber, which in turn communicates with said enlarged portion of said second interior chamber, said narrow portion of said second interior chamber being adapted to facilitate sliding entry of the second hard pet treat therealong;

said curved ledge of the second interior chamber and said narrow portion of said second interior chamber having an undeformed condition and a deformed condition; said undeformed condition persisting before insertion of the second hard pet treat and after insertion of the second hard pet treat into said enlarged portion of said second interior chamber; said deformed condition of said curved ledge of said second interior chamber and said narrow portion of said second interior chamber occurring during sliding insertion of the second hard pet treat along said narrow portion of said second interior chamber and past said curved ledge of said second interior chamber and on into said second interior chamber, so that the second hard pet treat can be inserted manually into said enlarged portion of said second interior chamber and be retained within said enlarged portion of said second interior chamber by said curved ledge of said second interior chamber;

an S-shaped wall separating said first interior chamber and said second interior chamber, said S-shaped wall having a thickened central portion;

whereby the first hard pet treat can be manually inserted into said first interior chamber causing the deformed condition to occur of said curved ledge of said first interior chamber and said narrow portion of said first interior chamber after which the undeformed condition occurs as the first hard pet treat is retained within the enlarged portion of said first interior chamber;

and whereby the second hard pet treat can be manually inserted into said second interior chamber causing the deformed condition to occur of said ledge of said second interior chamber and said narrow portion of said second interior chamber after which the undeformed condition occurs as the second hard pet treat is retained within the enlarged portion of said second interior chamber.

2. The pet chew toy of claim 1, wherein said first opening is disposed diametrically opposite to said second opening on said resilient body.

3. The pet toy of claim 1, further comprising a first air hole disposed at an end of said first opening of said resilient body, said first air hole being distal from said first opening, said first air hole being smaller than said first opening of said resilient body so that the first hard pet treat disposed inside said enlarged portion of said first interior chamber cannot be removed through said first air hole, and wherein said first air hole extends from said first interior chamber to an exterior surface of said resilient body, so that said first air hole prevents suction from trapping the tongue of a pet when in said first interior chamber; and further comprising a second air hole disposed at an end of said second opening of said resilient body distal from said second opening, said second air hole being smaller than said second opening of said resilient body so that the second hard pet treat inside said enlarged portion of said second interior chamber cannot be removed through said second air hole, and wherein said second air hole extends from said second interior chamber to an exterior surface of said resilient body, so that said second air hole prevents suction from trapping the tongue of a pet when in said second interior chamber.

* * * * *